Figure 1:
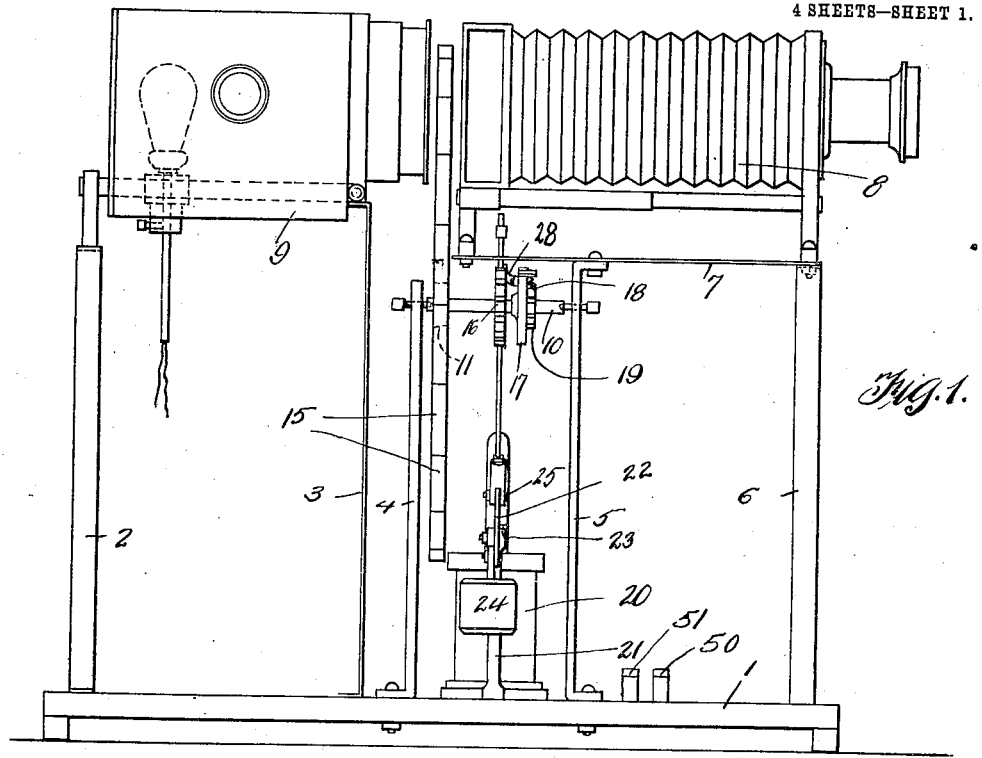

B. C. FERGUSON.
AUTOMATIC ADVERTISING DEVICE.
APPLICATION FILED MAR. 19, 1909.

946,500.

Patented Jan. 11, 1910.

4 SHEETS—SHEET 1.

Witnesses
Samuel Payne
K. H. Butler

Inventor
B. C. Ferguson
By
H. C. Evert & Co.
Attorneys

B. C. FERGUSON.
AUTOMATIC ADVERTISING DEVICE.
APPLICATION FILED MAR. 19, 1909.

946,500.

Patented Jan. 11, 1910.
4 SHEETS—SHEET 2.

Witnesses
Samuel Payne

Inventor
B. C. Ferguson
By
H. C. Evertol
Attorneys

B. C. FERGUSON.
AUTOMATIC ADVERTISING DEVICE.
APPLICATION FILED MAR. 19, 1909.
946,500.
Patented Jan. 11, 1910.
4 SHEETS—SHEET 3.
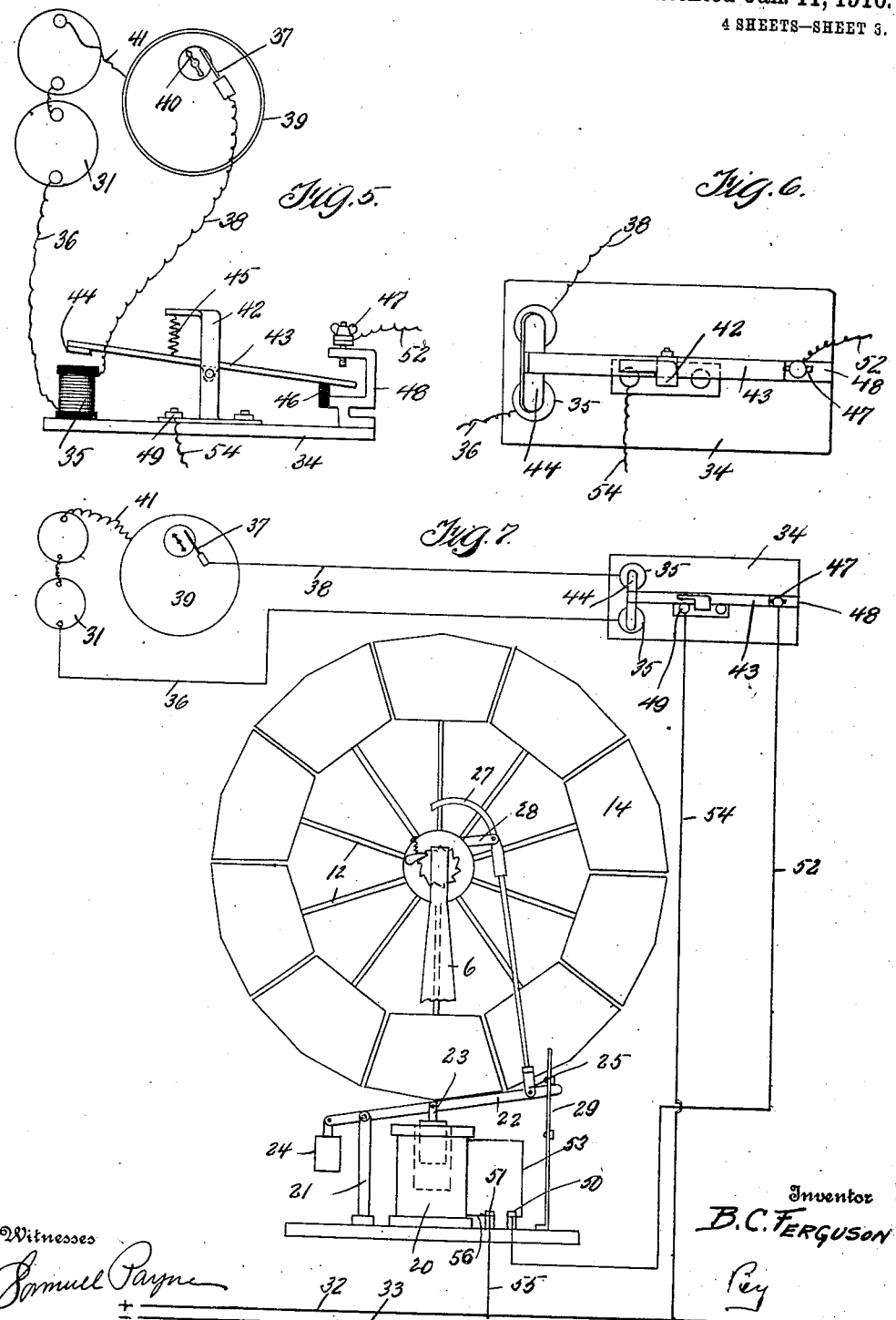

B. C. FERGUSON.
AUTOMATIC ADVERTISING DEVICE
APPLICATION FILED MAR. 19, 1909.
946,500.
Patented Jan. 11, 1910.
4 SHEETS—SHEET 4.
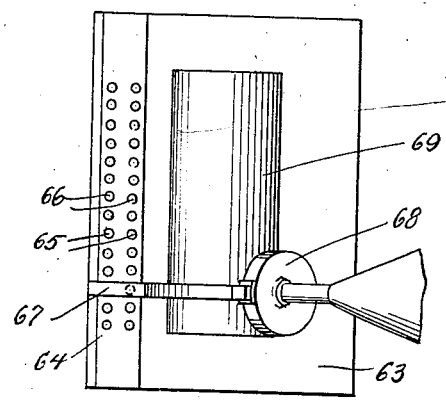
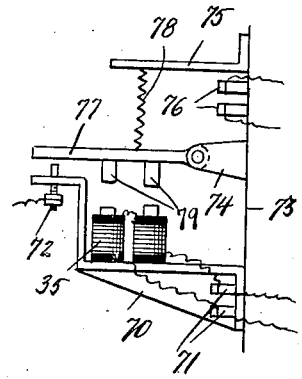
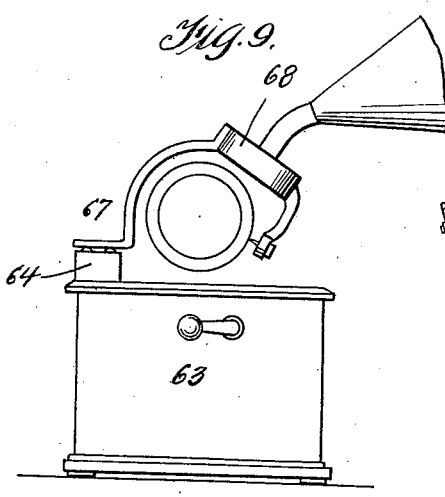
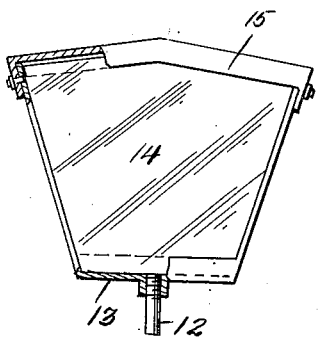
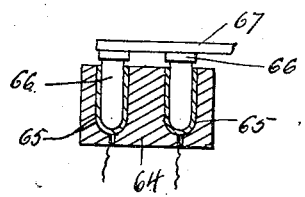
Witnesses
Samuel Payne
L. H. Butler
Inventor
B. C. Ferguson
By H. C. Curto
Attorneys

UNITED STATES PATENT OFFICE.

BERT C. FERGUSON, OF OIL CITY, PENNSYLVANIA, ASSIGNOR OF ONE-HALF TO MAURICE J. DALE, OF OIL CITY, PENNSYLVANIA.

AUTOMATIC ADVERTISING DEVICE.

946,500.  Specification of Letters Patent.  Patented Jan. 11, 1910.

Application filed March 19, 1909. Serial No. 484,497.

*To all whom it may concern:*

Be it known that I, BERT C. FERGUSON, a citizen of the United States of America, residing at Oil City, in the county of Venango and State of Pennsylvania, have invented certain new and useful Improvements in Automatic Advertising Devices, of which the following is a specification, reference being had therein to the accompanying drawing.

This invention relates to an automatic advertising device, and relates more particularly to a device for automatically feeding plates, films, or screens to an optical instrument such as a magic lantern, whereby advertisements, pictures, and designs carried by the films or plates will be projected by the instrument upon a screen.

The invention has for its primary object to provide an electrically actuated device of the above type adapted to be automatically controlled through the medium of a clock mechanism set to complete electric circuits that will operate the device and cause plates or films to be intermittently moved into position for projection by the magic lantern.

Another object of this invention is to provide a device that can be controlled by a phonograph or a reproducing machine, whereby songs and other matter can be accurately and properly illustrated during the rendition of a song by the reproducing machine.

The above objects are attained by providing a rotary plate or film carrier and positioning the same relative to a stereopticon, whereby each plate or film will be moved into position for projection upon a screen. Suitable and reliable electrical devices are utilized for intermittently moving the carrier, and this electric device can be governed and controlled either by a clock mechanism or a talking machine.

The invention will be hereinafter described in detail and then specifically claimed, and reference will now be had to the drawings forming a part of this application, wherein there is illustrated the preferred embodiments of my invention, but it is to be understood that the structural details thereof can be varied or changed without departing from the spirit or scope of the invention.

Figure 2:
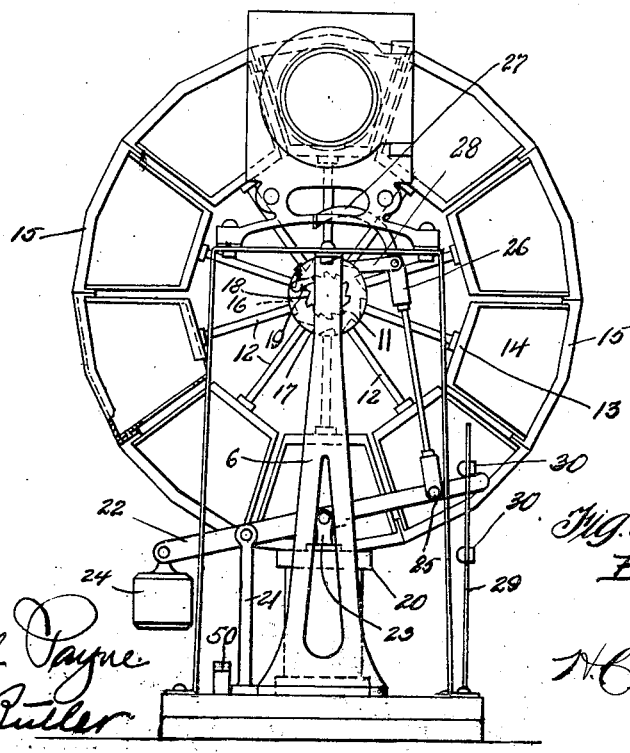
Figure 3:
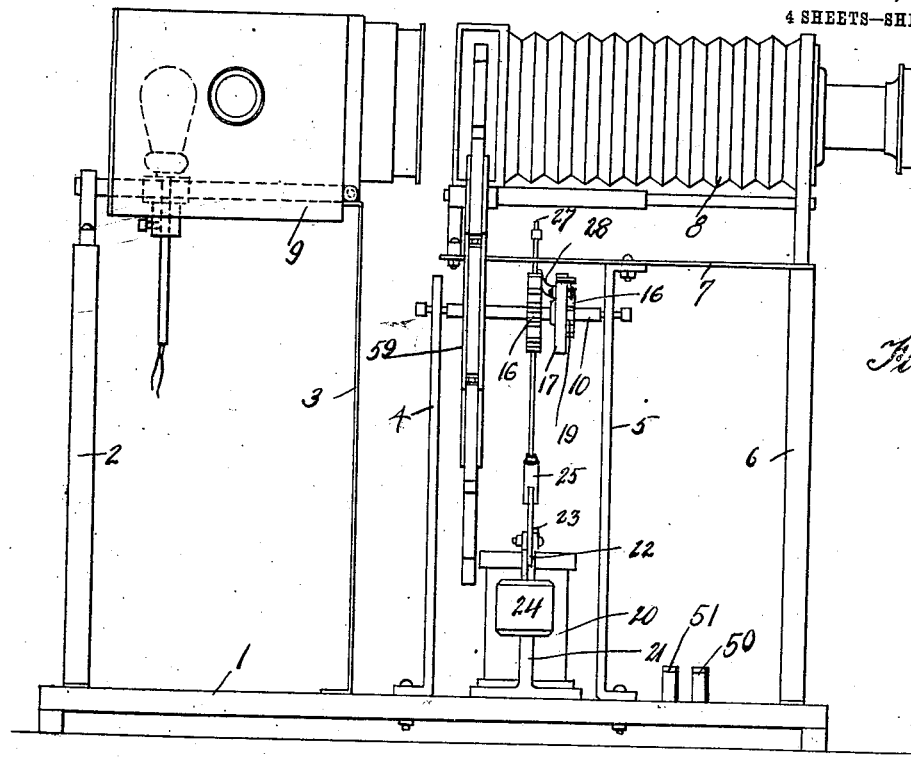
Figure 4:
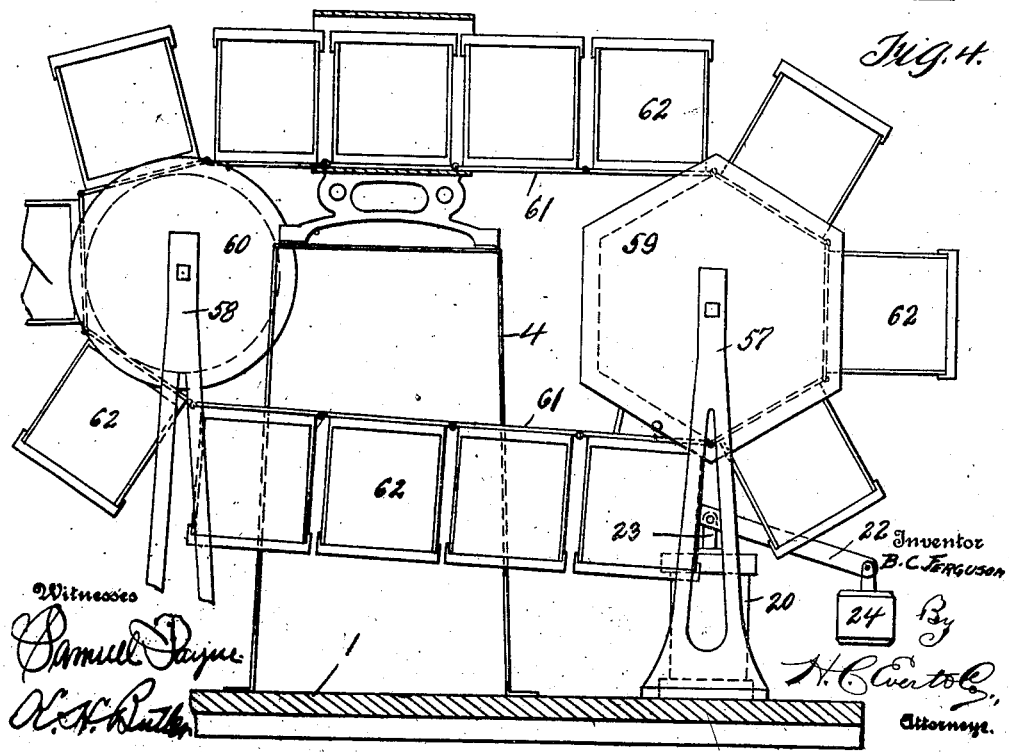

In the drawings, Figure 1 is a side elevation of an advertising device in accordance with this invention, Fig. 2 is a front elevation of the device, illustrating a rotary wheel carrier, Fig. 3 is a side elevation of a magic lantern equipped with a belt carrier, Fig. 4 is a front elevation of the belt carrier, Fig. 5 is a side elevation of a switch forming part of the device, Fig. 6 is a plan of the switch, Fig. 7 is a diagrammatic view of the device illustrating the electrical connections, Fig. 8 is a plan of the phonograph or reproducing machine constructed for controlling my device, Fig. 9 is an end view of the machine, Fig. 10 is an enlarged sectional view of the switch plugs of the phonograph, Fig. 11 is an elevation of a modified form of switch designed for my device, Fig. 12 is an enlarged front elevation of a portion of one of the carriers, partly broken away and partly in section, and Fig. 13 is a vertical sectional view of the same.

In the drawings, the reference numeral 1 designates a base provided with standards 2, 3, 4, 5 and 6, the standards 5 and 6 being connected at the upper ends thereof by a central longitudinal bar 7 supporting an adjustable casing 8 of an optical instrument by way of example, a magic lantern, while the standards 2 and 3 support a lamp house 9 for projecting the rays of light through the casing 8.

10 designates a longitudinal shaft revolubly mounted between the standards 4 and 5 adjacent to the upper ends thereof, and mounted upon said shaft contiguous to the standard 4 is a hub 11 supporting a plurality of radially disposed spokes 12, and the outer end of each spoke is provided with a plate or film carrier 13. Each carrier in elevation is polygonal to accommodate polygonal transparent plates or films 14. The outer or upper end of each carrier is open to permit of the plates being placed in position, and each carrier is provided with a detachable cap 15 for retaining the plate within the carrier. As shown in Fig. 2 of the drawings,—the arrangement and shape of the carriers provides practically a wheel, and when the shaft 10 is revolved, the plates 14 are successively carried into position between the lamp house 9 and the casing 8, whereby advertisements, pictures or other designs upon the plates 14 will be projected through the casing 8 and onto a screen, (not shown).

16 designates a large ratchet wheel fixed upon the shaft 10 and adjacent to said ratchet wheel is a loosely mounted disk 17 having the front side thereof provided with a spring pressed pawl 18 for engaging a small ratchet wheel 19 mounted upon the shaft 10.

20 designates a solenoid located upon the base or between the standards 4 and 5 and directly beneath the shaft 10. Adjacent to the solenoid 20 is a post 21 carried by the base 1 and fulcrumed upon the upper end of the post 21, is a lever 22 which is pivotally connected to the core 23 of the solenoid 20. The short arm of the lever 22 is provided with a pivoted weight 24, while the long arm of said lever is pivotally connected as at 25, to a vertical actuating arm 26 having a hook-shaped end 27 for engaging the ratchet wheel 16. The arm 26 is pivotally connected to a curved link 28 fixed to the disk 17, said link being tangentially disposed relative to said disk, for a purpose that will hereinafter appear.

29 designates a vertical gage carried by the base 1, said gage having adjustable stops 30 for limiting the movement of the lever 22.

In connection with the mechanism just described, I use a suitable source of electrical energy, in the form of batteries 31, and ordinary electric light current conveyed by feed wires 32 and 33.

34 designates a switch plate having electromagnets 35 connected to the batteries 31 by a wire 36 and to a contact 37 by a wire 38. The contact 37 is carried by a clock 39 of a convenient form, said clock having a second hand 40 adapted to engage the contact 37. The clock 39 is in circuit with the batteries 31 through the medium of a wire 41.

42 designates a standard carried by the switch plate 34 and fulcrumed upon said standard is a switch arm 43 having an armature 44 adapted to be attracted to the electro-magnets 35, when said electro-magnets are energized by the second hand 40 engaging the contact 37. The switch arm 43 is normally held out of engagement with the electro-magnets 35 by a retractile spring 45 connecting said standard with said switch arm, and the movement of said switch arm 43 is limited at the rear end thereof by an insulated block 46 and a binding post 47, carried by a bracket 48 mounted upon the switch plate 34. The switch plate 34 is provided with a binding post 49 and the base plate 1 is provided with binding posts 50 and 51.

52 designates a wire connecting the binding post 47 with the binding post 50, wire 53 designates another wire connecting the binding post 50 with the solenoid 20.

54 designates a wire connecting the binding post 49 with the wire 33, wire 55 designates a wire connecting the wire 32 with the binding post 51, said binding post 51, being connected to the solenoid 20 by a wire 56.

Before describing modifications of the invention, the operation of the mechanism just described will be set forth. A wiping contact is made between the second hand 40 and the contact 37, establishing a circuit through the electro-magnets 35. When these magnets are energized, the armature 44 is attracted, causing the switch arm 43 to engage the binding post 47, thereby completing an electric circuit in connection with the feed wires 32 and 33 for energizing the solenoid 20. Immediately upon said solenoid being energized, the lever 22 is shifted to pull downwardly upon the actuating arm 26. Such a movement of the actuating arm revolves the disk 17 upon the shaft 10 through the medium of the link 28, and as said disk is shifted, the pawl 18 thereof which is in engagement with the ratchet wheel 19, moves said ratchet wheel and the shaft 10, the movement of said shaft being limited by the hook-shaped end 27 of the arm 26 contacting with the ratchet wheel 16. The movement of the shaft 10 is sufficient to shift one plate 14 out of alinement with the sight-openings of the lamp house 9 and the casing 8 and another plate into position. When the second hand 40 moves out of engagement with the contact 37, the electro-magnets 35 are deënergized; spring 45 restores switch arm 43 to its normal position and the solenoid 20 is deënergized. The weight 24 then restores the lever 22 to its normal position, also the arm 26 and link 28. The hook-shaped end 27 of the arm 26 holds the ratchet wheel 16 and prevents a rearward rotation of the shaft 10, while the rearward movement of the disk 17 allows the spring-pressed pawl 18 to obtain a fresh grip upon the ratchet wheel 19. The intermittent movement of the plates 14 is regulated by the speed of the hand 40 and by the number of contacts 37 positioned to be engaged by said hand.

In Fig. 4 of the drawings, the base 1 is provided with two sets of standards 57 and 58, the sets of standards 57 supporting a hexagon shaped wheel 59 and the set of standards 58 supporting a circular wheel 60. Over these wheels travel an endless carrier 61 having a plurality of plates or films 62, which in the present instance are rectangular. The carrier 61 is adapted to travel through the rear end of the casing 8, and a similar mechanism is used between the set of standards 57 for intermittently moving the carrier 61.

The manner of controlling the device in connection with a phonograph or similar talking machine, is shown in Figs. 8 to 10 inclusive, wherein the phonograph box 63 is provided with a switch plate 64 having a plurality of plug sockets 65 for detachable plugs 66, and these plugs are used in lieu of the clock 39 and the contact 37. Adapted to engage the plugs 66 and establish an electrical circuit through the electro-magnets 35, is a contact arm 67, carried by the movable member 68 of the phonograph. As the member 68 traverses the record cylinder 69 of the talking machine, electrical circuits are established by moving the plates or films in their order into a position relative to the magic lantern, whereby the matter reproduced by the record cylinder 69 will be illustrated at the proper time.

A modification of the switch shown in Figs. 5 and 6 of the drawings is illustrated in Fig. 11, wherein a bracket 70 is provided with the electro-magnets 35 and with binding posts 71 and a contact 72. The bracket 70 is adapted to be supported from a suitable support 73 and this support is provided with additional brackets 74 and 75, also with binding posts 76. The bracket 74 supports a switch arm 77 adapted to engage the contacts 72, said switch arm being connected by a retractile spring 78 to the bracket 75 and provided with armature 79 adapted to be attracted by electro-magnets 35. This form of switch is particularly designed for a wall in proximity to the magic lantern.

Having now described my invention, what I claim as new, is:—

1. The combination with a base, a lamp house carried thereby, an optical instrument casing supported by said base, a suitable source of electrical energy, and an automatically operated switch in circuit with said source of electrical energy, of a device for successively moving plates between said lamp house and said casing, said device comprising standards carried by said base, a shaft revolubly mounted between said standards, a rotary plate carrier mounted upon said shaft, plates detachably mounted in said carrier, a solenoid located upon said base beneath said shaft and in circuit with said switch, and a mechanism intermittently actuated by said solenoid for successively moving the plates of said carrier between said lamp house and said casing, said mechanism including a lever, a ratchet wheel, an arm moved by said lever for moving said ratchet wheel, a ratchet wheel adapted to be engaged by said arm for preventing a rearward rotation of said carrier, and means for limiting the movement of said lever.

2. The combination with an optical device embodying an incandescent lamp, electrical connections between said lamp and a source of electrical energy, and an automatically operated switch interposed in said connections, of a shiftable plate carrier adapted when moved to successively position plates in operative relation with respect to said instrument whereby the pictures, advertisements or designs upon the plates will be projected by said instrument, said carrier embodying a plurality of plate-holding frames, means carried by each of the frames for removably securing the plates therein, a solenoid in said connections, a revoluble element for transmitting motion to said carrier, a ratchet wheel fixed to said revoluble element, a disk loosely mounted upon said revoluble element, an actuating arm having hook-shaped ends adapted to engage said ratchet wheel to prevent back rotation of said element, a link connecting the disks to said arm, an operative connection between the disk and said element for intermittently rotating the latter when said arm is actuated, means operated by said solenoid for actuating said arms, and means for intermittently operating said switch whereby said solenoid is energized and said lamp illuminated.

3. The combination with an optical device embodying an incandescent lamp, electrical connections between said lamp and a source of electrical energy, and an automatically operated switch interposed in said connections, of a shiftable plate carrier adapted when moved to successively position plates in operative relation with respect to said instrument whereby the pictures, advertisements or designs upon the plates will be projected by said instrument, said carrier embodying a plurality of plate-holding frames, means carried by each of the frames for removably securing the plates therein, a solenoid in said connections, a revoluble element for transmitting motion to said carrier, a ratchet wheel fixed to said revoluble element, a disk loosely mounted upon said revoluble element, an actuating arm having hook-shaped ends adapted to engage said ratchet wheel to prevent back rotation of said element, a link connecting the disk to said arm, an operative connection between the disk and said element for intermittently rotating the latter when said arm is actuated, means operated by said solenoid for actuating said arms, means for intermittently operating said switch whereby said solenoid is energized and said lamp illuminated, and means for limiting the movement of the means actuated by the solenoid.

4. The combination with an optical device embodying an incandescent lamp, electrical connections between said lamp and a source of electrical energy, and an automatically operated switch interposed in said connections, of a shiftable plate carrier adapted when moved to successively position plates in operative relation with respect to said instrument whereby the pictures, advertisements or designs upon the plates will be projected by said instrument, said carrier embodying a plurality of plate-holding frames, means carried by each of the frames for removably securing the plates therein, a solenoid in said connections, a revoluble element for transmitting motion to said carrier, a ratchet wheel fixed to said revoluble element, a disk loosely mounted upon said revoluble element, an actuating arm having hook-shaped ends adapted to engage said ratchet wheel to prevent back rotation of said element, a link connecting the disk to said arm, an operative connection between the disk and said element for intermittently rotating the latter when said arm is actuated, a counter-balanced lever operated by the solenoid for actuating said arm, means for intermittently opening and closing said switch for intermittently illuminating said lamp, and a pair of stops arranged with respect to the solenoid for limiting the movement in either direction of said lever.

5. The combination with an intermittently illuminated optical instrument, of an intermittently operated carrier adapted to position plates and provided with pictures, advertising matter and designs in operative relation with respect to said instrument whereby the advertisements, pictures, or designs will be projected by said instrument, plate-holding frames attached to said carrier and each provided with an open end, and means carried by the open end of each of said frames for removably retaining the plate in each of said frames, and electrically operated means for intermittently shifting the carrier.

6. In a device of the character described, the combination with an intermittently illuminated incandescent lamp and an optical instrument arranged forwardly of said lamp, of a shiftable carrier adapted to intermittently position plates having advertisements, pictures and designs thereon between the instrument and said lamp, whereby the representations upon the plates will be projected by said instrument, plate-holding frames connected to the carrier and each having an open end, closure means for the open end of each frame whereby a plate is removably secured in the frame, a solenoid, electrical connections between the lamp and the solenoid and a source of electrical energy, means operated by the solenoid when the latter is energized for intermittently shifting said carrier.

7. In a device of the character described, the combination with an intermittently illuminated incandescent lamp and an optical instrument arranged forwardly of said lamp, of a shiftable carrier adapted to intermittently position plates having advertisements, pictures and designs thereon between the instrument and said lamp, whereby the representations upon the plates will be projected by said instrument, plate-holding frames connected to the carrier and each having an open end, closure means for the open end of each frame whereby a plate is removably secured in the frame, a solenoid, electrical connections between the lamp and the solenoid and a source of electrical energy, means operated by the solenoid when the latter is energized for intermittently shifting said carrier, and an intermittently operated making and breaking device interposed in said connections.

In testimony whereof I affix my signature in the presence of two witnesses.

BERT C. FERGUSON.

Witnesses:
C. A. DALE,
MAX H. SROLOVITZ.